US009486751B2

(12) United States Patent
Collins

(10) Patent No.: US 9,486,751 B2
(45) Date of Patent: Nov. 8, 2016

(54) MIXING APPARATUS

(71) Applicant: Jack David Collins, Melbourne (AU)

(72) Inventor: Jack David Collins, Melbourne (AU)

(*) Notice: Subject to any disclaimer, the term of this patent is extended or adjusted under 35 U.S.C. 154(b) by 178 days.

(21) Appl. No.: 14/451,591

(22) Filed: Aug. 5, 2014

(65) Prior Publication Data

US 2014/0339715 A1 Nov. 20, 2014

Related U.S. Application Data

(63) Continuation of application No. PCT/AU2013/000096, filed on Feb. 6, 2013.

(30) Foreign Application Priority Data

Feb. 6, 2012 (AU) .................. 2012900425

(51) Int. Cl.
*C02F 7/00* (2006.01)
*B01F 3/04* (2006.01)
*C02F 1/24* (2006.01)
*C02F 3/16* (2006.01)
(Continued)

(52) U.S. Cl.
CPC ........... *B01F 3/0446* (2013.01); *B01F 3/0451* (2013.01); *B01F 3/04099* (2013.01); *B01F 5/0212* (2013.01); *B01F 5/0413* (2013.01); *B01F 5/10* (2013.01); *C02F 1/24* (2013.01); *C02F 1/74* (2013.01); *C02F 3/16* (2013.01); *C02F 7/00* (2013.01); *C02F 2103/007* (2013.01); *C02F 2103/22* (2013.01); *C02F 2103/32* (2013.01); *C02F 2203/006* (2013.01); *C02F 2303/02* (2013.01); *Y02W 10/15* (2015.05)

(58) Field of Classification Search
CPC .... B01F 3/04; B01F 3/04099; B01F 3/0446; B01F 5/04; B01F 5/0403; B01F 5/0413; C02F 7/00

USPC .............. 261/30, 34.1, 66, 77, 119.1, 121.1, 261/DIG. 54; 210/220, 199
See application file for complete search history.

(56) References Cited

U.S. PATENT DOCUMENTS 4,226,719 A * 10/1980 Woltman .............. B01F 3/0876
                                                                210/220
5,057,230 A    10/1991 Race
6,106,729 A *  8/2000 Prince ...................... C02F 7/00
                                                                210/170.06

FOREIGN PATENT DOCUMENTS

GB          1 400 064         7/1975
WO    WO 2013/116893 A1       8/2013

OTHER PUBLICATIONS

International Search Report, dated Apr. 22, 2013; 5 pages.

*Primary Examiner* — Robert A Hopkins
(74) *Attorney, Agent, or Firm* — Seyfarth Shaw LLP

(57) ABSTRACT

A mixing apparatus in the form of an aerator for location within a body of water to be remediated by oxygenating the water, including an inlet through which water is pumped into the aerator, the inlet includes a branched distributor in which the inlet divides into four equal branches for forming four equal flow paths for the water. Each of the four equal pathways is provided with an air injector in the form of a venturi for introducing air into the water flow path in order to aerate the water. The advantage of the aerator is that the distributor is designed to have balanced flow so that equal flows of water pass through each flow path to introduce equal volumes of air, which increases the efficiency of the aerator. Forms of the aerator can have two or more distributors in which all individual flow paths are substantially equal to improve the efficiency of the aerator.

20 Claims, 8 Drawing Sheets

(51) Int. Cl.
  *B01F 5/02* (2006.01)
  *B01F 5/04* (2006.01)
  *B01F 5/10* (2006.01)
  *C02F 1/74* (2006.01)
  *C02F 103/22* (2006.01)
  *C02F 103/00* (2006.01)
  *C02F 103/32* (2006.01)

MIXING APPARATUS

CROSS REFERENCE TO RELATED APPLICATION

This application is a continuation application of International Application No. PCT/AU2013/000096, filed on Feb. 6, 2013, entitled "MIXING APPARATUS," which claims priority to Australian patent application No. AU 2012900425, filed Feb. 6, 2012. The above-referenced applications are hereby incorporated herein in their entireties by reference.

FIELD

The present invention relates generally to mixing apparatus, devices and assemblies for mixing materials.

In one form, the invention relates to mixers for mixing two fluids together.

In one form, the invention relates to mixing two different fluids together in which the two different fluids have two different states of matter, such as a liquid and a gas.

In one form, the present invention relates to mixing apparatus, devices or assemblies for aerating liquids, particularly water.

The present invention finds particular application as a mixer having a multitude of flow paths provided with individual mixing elements for mixing more efficiently, a liquid with a gas to facilitate absorption of the gas into the liquid to pretreat or treat the liquid, to beneficiate or remediate the liquid so that the liquid can be reused, recycled or discharged to waste.

Although the present invention will be described with particular reference to one or more embodiments of the mixing apparatus, particularly for aerating a body of water, it is to be noted that the scope of the protection relating to the mixing apparatus is not restricted to the described embodiments, but rather the scope of protection extends to include other forms and arrangements of the mixers, other component parts of the various forms and arrangements of the mixers, and to the use of the various forms and arrangements of the mixers in applications other than described, including applications other than remediating water. Embodiments find application in a variety of different environments for a variety of different purposes and functions for mixing a variety of different materials with one another for a variety of different purposes.

BACKGROUND

It is often desirable to mix two or more separate materials with one another to form a more or less homogenous or disperse mixture or to treat one of the materials with another material. Often the materials being mixed are not only different materials, but have different states, such as for example, one material is a gas, whereas the other material is a liquid. Although various methods have been provided in the past for mixing gases and liquids together, such as for example, to aerate the liquid as an example of the application of the mixers, not all previously available mixing systems are suitable in a range of applications owing to their poor efficiency in mixing the different materials with one another. Efficient mixing of different types of fluids, such as dissimilar fluids and different types of materials, such as solids with fluids, are often required in many industries, including the water treatment industry generally, including waste water treatment, sewerage treatment applications and the like. In many instances, aeration of water based waste materials, such as for example, water wastes discharged from sewage treatment plants, is required to allow desired remediation processes to take place, such as for example, remedial water treatment processes, bioremediation processes or the like to maintain the health of the body of water or to assist in treatment of the water to allow the waste water to be discharged to the environment. As an example, oxygen is often used to treat waste water, such as for example, sewerage, or to treat waste materials from chemical processing plants, including food and beverage plants, or to improve the quality of a body of water prior to discharge to a drainage system so as to oxygenate the water to enable the water to support organisms, such as for example, populations of marine species, or the like, and to maintain conditions in the body of water to enable the aquatic species to survive.

Bodies of water in a more or less stagnant condition, such as a pond, lake or similar, often require treatment to maintain the health of the water in the body of water in order to allow the water to be used for a variety of purposes, or to maintain the water in a fresh condition to prevent unwanted biological processes taking place to degrade the quality of the water, such as for example, to reduce the chances of algal blooms, to reduce the emission of malodours from decompositions taking place in the body of water, or the like occurring. One way of maintaining the water in a healthy condition is to aerate the water to increase the oxygen content of the water, such as for example, the body of water is treated by biotreatment techniques in which micro organisms use oxygen to convert contaminants of the waste water into environmentally more acceptable substances which are not objectionable, such as for example, not malodorous, which have the benefit of remediating the body of water.

Existing mixers such as for example, surface aerators, pressurised gas pumping systems, vortex mixers, and currently available aerators have been used in the past to aerate water but have met with limited success due to their low efficiency and hence poor effectiveness which in turn, make them expensive to build, install and maintain.

One of the problems causing the lack of efficiency of the mixer is thought to be concerned with forcing the water to absorb sufficient quantities of oxygen to increase the oxygen content of the water above a critical amount so as to allow remediation processes to take place in the body of water by existing aerators having different rates of flow of water through various parts of the aerator which contributes to their poor efficiency, particularly as there is little or no control over the various rates of flow through different parts of the aerator.

Shortcomings of previously available inefficient mixers include having to provide multiple numbers of mixers, having to provide mixers of a large capacity, having to provide mixers of considerable power, all of which increase capital expenditure on the equipment, the cost of installation of the equipment, and maintenance and operating costs of the equipment, as well as the attendant problems caused by having to use such large scale and powered installations, such as the environmental effects through increased use of fuel, noise pollution, use of valuable resources, or the like. Therefore, there is a need for a mixer which is more efficient than currently available mixers for use in mixing two different materials with each other in order to be able to increase the interaction of one material with the other, such as the absorption of oxygen into the water, particularly to aerate bodies of water to increase the oxygen content of the water in order to maintain the health of the body of water.

One of the problems of currently used surface aerators is the high cost of maintaining the aerators in working order and the high cost of replacement parts used in the repair of the surface aerators. The cost of maintaining current aerators is almost as expensive as the capital cost of purchasing new aerators. Further, the effort and expense of moving currently available aerators in and out of the water for repair and maintenance is great due to the size and complexity of the installations because such movement requires the use of an industrial crane to lift the aerator. Further, as an example, the cost of repairing the gear box and other moving parts of currently available surface aerators has reached the point where repairs are being delayed for as long as possible and the actual use of the aerator has been reduced to a bare minimum in order to save costs, all of which result in the health of the body of water being placed at risk, such as for example, the lack of aeration is reduced to such an extent that the water is potentially a health hazard, such as for example, by the levels of sludge increasing, algal blooms occurring, or the body of water becoming putrid or the like.

Accordingly, it is an aim of the present invention to provide a mixer having an efficiency which is more economically acceptable.

Accordingly, it is an aim of the present invention to provide a mixer which enables increased amounts of water to be treated to maintain the health of the water but at a lower cost.

Accordingly, it is an aim of the present invention, to provide an arrangement for the flow of water through the mixing apparatus which arrangement provides increased efficiency by the mixer having an arrangement which allows the separate flows of water in the mixer being more consistent with each other.

Accordingly, it is an aim of the present invention, to provide an aerator installation having a more consistent flow through the aerator to promote more efficient treatment of water by having equal and/or balanced flows through the various pathways of the aerator.

Accordingly, it is an aim of the present invention to provide an aerator having more than a single flow path through the aerator in which the individual flow paths are more closely matched or balanced with one another so as to promote substantially even and consistent flow of water through the individual flow paths resulting in substantially equal flow rates through the various flow paths leading to improved efficiency of aerating the liquid being treated.

SUMMARY

According to one form of the invention, there is provided a mixing apparatus for forming a mixture of a first material and a second material, the first and second materials being dissimilar to each other, the mixing apparatus comprising an inlet for admitting the first material to the mixing apparatus, a first conduit in fluid communication with the inlet forming a first flow path for the first material, at least one second conduit in fluid communication with the inlet forming a second flow path for the first material, the first conduit being provided with a first distribution member for forming a first set of individual flow paths, each of the first set of individual flow paths being in or through respective first discharge members, the second conduit being provided with a second distribution member for forming a second set of individual flow paths, each of the second set of individual flow paths being in or through respective second discharge members, each respective discharge member of the first and second distribution member being provided with a mixing element for introducing the second material into the flow of first material in or through the first and second discharge members wherein the distribution of the first material within the mixing apparatus is arranged such that the flow of the first material in each one of the respective first and second discharge members is substantially the same as each other due to the distribution of the flow of first material within the mixing apparatus being substantially balanced.

According to one form of the invention, there is provided a mixing apparatus for forming a mixture of a first material and a second material, the first and second materials being dissimilar to each other, the mixing apparatus comprising an inlet for admitting the first material to the mixing apparatus, a first conduit in fluid communication with the inlet for forming a first flow path for the first material, the first conduit having a first distribution member for forming the first flow path into a first set of individual flow paths, each flow path of the first set of individual flow paths having a first discharge member including, a mixing element for introducing the second material into the flow of the first material through the first discharge members to effect mixing of the first material and the second material wherein the distribution of the first material through the first distribution member is arranged such that the flow of the first material in each one of the respective first individual flow paths is substantially the same as each other to provide balanced flow through the mixing apparatus.

According to one form of the present invention, there is provided a method of forming a mixture of a first material and a second dissimilar material using a mixing apparatus comprising the steps of introducing the first material to the mixing apparatus through an inlet, conveying a first portion of the first material through a first conduit in fluid communication between the inlet and a first distribution member, using the first distribution member to distribute the first portion of the first material into individual ones of a first set of individual discharge members in fluid communication with the first distribution member to form respective individual flow paths of the first material through the first set of individual discharge members, introducing the second material into the first set of discharge members through mixing elements provided in the first set of individual discharge members, mixing the second material with the first material in each of the respective discharge members to form a combined mixture of the first material and the second material using the respective mixing elements provided in each of the first set of individual discharge members, wherein the flow of the combined mixture of first and second materials in each one of the discharge members is substantially the same as each other due to the flows of the first material and/or mixture of first material and second material through the mixing apparatus being substantially balanced.

According to one form of the present invention, there is provided a mixing apparatus for forming a mixture of a first material and a dissimilar second material, comprising an inlet for introducing the first material to the mixing apparatus, a first conduit in fluid communication with the inlet and a second conduit in fluid communication with the inlet and with the first conduit, a first distribution member located intermediate the first conduit and a first set of individual discharge members so that each of the first set of discharge members is in fluid communication with the first conduit, a second distribution member located intermediate the second conduit and a second set of individual discharge members so that each of the second set of discharge members is in fluid communication with the second conduit, each of the first set of individual discharge members and each of the second set of individual discharge members being provided with respective mixing elements for introducing the second material into the respective discharge members to mix with the first material therein, wherein the first and second conduits are arranged with respect to each other and the first set of discharge elements are arranged with respect to each other and the second set of discharge elements are arranged with respect to each other such that the flow of the combined mixture of first and second materials in each one of the discharge members is substantially the same as one another due to balanced flow through the mixing apparatus from the inlet to the discharge members.

ASPECTS OF EMBODIMENTS

It is to be noted that the use of the term 'balanced flow' means that the flow in each equivalent part of the aerator having two or more corresponding similar flow paths is substantially the same, including one or more of the following: the flows being volumetrically the same, having substantially the same mass flow rates, having substantially the same velocity flow rates, and the like. Preferably, balanced flow refers to individual flows being volumetrically the same as one another. Typically, the flow rates are measured at the inlet of the air and the outlets of the water and air mixture from the aerator or mixer to achieve the balanced flows.

In one form, the mixing apparatus is a mixer, a surface mixer, a submerged mixer, an in situ mixer, or similar mixing assembly. In one form, the mixing assembly is or includes a multitude of mixing elements for introducing one of the materials into the mixer. More typically, the mixing elements introduce the second material into the first material, typically into flow paths of the first material in the mixer. In one form, the amount or volume of the first material can be greater than, about the same as, or less than the amount or volume of the second material in the mixed stream in the respective discharge members, typically the amount of water can vary from about being about one tenth to up to about ten times the amount of air in the mixed stream. However, in other embodiments, the amount of the second material, being air, is up to about twice the amount of water in the mixed stream. Forms of embodiments of the mixing apparatus have ranges of relative amounts of air to water from about 1:50 to about 50:1, typically in the range from about 1:40 to about 40:1, more typically from about 1:20 to about 20:1, preferably a ratio of air to water up to about 1:10 to about 10:1.

In one form, the first material is a fluid. Typically, the first material is a liquid. More typically the liquid is water. In one form, the water to be treated is a waste water, a body of water requiring treatment, a stagnant body of water, water having a low oxygen content, water requiring biological remediation, a reservoir, a lake, holding dam, pond, settling pond or dam, sludge reservoir, contaminated water dump, or the like.

In one form, the second material is a fluid, typically a fluid which is dissimilar from the first material requiring treatment. In one form, the fluid is a gas. Typically, the gas is air. More typically, the gas is oxygen in admixture with other gases. In one form, the mixing apparatus is an aerator for aerating water with air to enable the air to be used by living organisms in the water to improve the health of the water by significantly reducing pathogens.

In one form, the inlet is a tube, typically a tube connected directly or indirectly to the outlet of a suitable pump or pump assembly. In one form, the inlet is optionally connected to a hollow structure, such as for example, a plenum chamber, housing, shroud, cover, base or the like. However, in one embodiment, the inlet is connected directly to the outlet of the pump for receiving directly from the water storage body of water through the pump into the inlet of the mixing apparatus.

In one form, the inlet is in the form of a conduit, tube, pipe or similar. The inlet has a single inlet located at or towards one end of the tube. Typically, the inlet is a branched or divided tube having at least two outlets, or discharge ports, located at the other end of the tube from the inlet. More typically, the single inlet of the tube merges gradually and continuously in a smooth transition from the inlet end of the tube to form the two branches or two bores at the outlet or discharge end of the tube, so that the tube is a one into two tube.

In one form, the tube is a cylindrical tube at the inlet end and two separate cylindrical tubes at the outlet end.

In one form, the inlet tube is provided with a transition portion located intermediate the inlet end and the two outlets to form a smooth gradual transition from the one inlet tube to the two outlet tubes.

In one form, the transition portion has a curved wall portion, typically two curved wall portions, more typically two convexly curved outer wall portions in opposed face to face relationship with each other on either side of the inlet. In one form, the transition portion is a diverging portion in the direction of flow of fluid through the inlet to form two or more divergent flows of water therethrough.

In one form, the shape of the transition portion is bicuspoid or similar shape having two points or pointed parts formed by two converging surfaces, such as for example, having a nipped waist on either side of the inlet in an inwardly directed direction.

In one form, the inlet is flow rated to remove any surface irregularities from the inside surface of the bores of the inlet tube, including from the inlet portion, from the transition portion and from the two bores or branches at the outlet end. In one form, the internal surface of the inlet is gas flowed to balance the flows of fluid through each of the two bores so that the rate of flow through the bores is substantially the same, i.e. balanced with respect to one another. In one form, the balanced flow is individual flows which are volumetrically substantially the same as each other. However, in other flows, the balanced flow is determined by the substantially identicalness of the mass flow or amount of water through the different passages of the distributor.

In one form, the mixing apparatus has a single distributor member or two or more distributor members. If there are two or more distributor members, the first distributor member of the mixer is the same as or similar to the second distributor member of the mixer. As the distributor members are substantially identical, only one distributor member will be described in detail for ease of understanding and brevity of description. Typically, the distributor member has an inlet end in fluid communication with one of the outlet bores of the inlet tube. Typically the inlet end of the distribution member is of the same size and configuration as the discharge end of one bore of the outlet of the inlet tube, typically, having the same diameter, and more typically having the same wall thickness. One form of the distributor is a manifold having a single inlet and four individual outlets forming a one into four member in which there is balanced flow through each of the four outlet members.

In one form, the inlet of the distributor member is cylindrical or circular. In one form, the distributor member is integrally formed with the inlet tube. In one form, the distributor member is separate to the inlet tube and connected thereto by a suitable fastener, such as a fluid tight fastener or the like, including a flanged coupling or similar.

In one form, the distributor member is provided with more than a single outlet or discharge, typically two, three, four or more outlet ports. Preferably, the distributor member has four outlet ports or branches, typically in the form of four cylindrical hollow tubes, more typically, located in spaced apart relationship to each other.

In one form, the distributor member gradually diverges from a single inlet bore to four divergently spaced apart bores. More typically, there is a smooth transition from the single inlet of the distributor member to the four outlet ports.

In one form, the internal surfaces of the inlet and outlets of the distributor member are smooth and free from surface irregularities including projections, depressions or the like.

In one form, the distributor member has an inlet end, four outlets and a transition portion located intermediate the inlet end and the four outlet ends. More typically, there is a smooth transition of the internal walls of the transition portion.

In one form, the shape of the transition portion is generally quadricuspoid having four points internally directed to the central axis of the transition portion. In one form, the transition portion is symmetrical about the central axis when viewed in cross-section. In one form, the walls of the four diverging bores forming the outlet of the distributor member are curved, generally convexly curved having a nipped waist, typically at four regularly shaped apart locations around the outer perimeter of the transition portion.

Typically, the cross-section of the distributor member has the appearance generally of a shape having four part circles in partially overlapping relationship to one another.

In one form, the branched distributor element is flow-rated or is gas-flowed so that there is substantially identical flow rates of fluid through each of the four branches to improve the efficiency of the aerator. One form of the flow rating is balanced flow in which the same amount of water flows through each f the four branches, such as the same amount volumetrically.

In one form, the four discharge ports or outlet ends of the distributor members are curved in the lengthwise extending direction so as to extend in substantially parallel relationship to each other, typically in an upwardly directed vertical direction when the aerator is in the normal in-use position.

In one form, each of the four outlet ports of the distributor member is provided with a discharge member through which water is discharged from the aerator. In one form, the discharge member is provided with one or other forms of the mixing element. Typically, each discharge member is provided with a mixing element so that the number of mixing elements is the same as the number of discharge ports or members.

In one form, the mixing element provided in the discharge member or element is an air injector or similar for introducing air into the discharge element to aerate the fluid flowing through the discharge element.

In one form, each mixing element is a venturi. Typically, the venturi is provided with one or more apertures, bores, pathways, passages, openings or the like through which air is introduced into the mixing apparatus. More typically, the venturi has a single control axial bore.

In one form, the venturi is provided with tapering walls, typically straight sided tapering walls which are tapered from a relatively wider width of the entrance or inlet for the air to a relatively narrow width at the inboard or discharge end from which the aerated water is discharged.

Typically, the venturi reduces about 50% in volume from the inlet end to the discharge end. More typically, the amount of reduction in size of the venturi is from an internal diameter of about 100 mm to about 10 mm, typically from about 80 mm to about 20 mm, preferably from about 60 mm to about 30 mm and more preferably about 58 mm to about 30 mm.

In one form, the taper of the inside wall of the venturi is from about 10° to 30°, typically about 15° to 25°, preferably about 20°.

In one form, the components of the aerator, such as for example, the tubing from which the various parts are manufactured, including the transition portions and the like, are made from marine grade stainless steel, more typically 316 s/s grade stainless steel.

In one form, the aerator is located within the body of water. In one form, the aerator is mounted on a fixed base anchored at one location within the body of water. In one form, the aerator is free to float on the surface of the body of water. In one form, the aerator is mounted on a floating platform on the surface of the body of water, typically on a pontoon so that the tubing defining the pathways through the aerator is located above the waterline thereby enhancing the aeration process, and/or efficiency of operation of the aerator.

In one form, the mixing apparatus is provided with a motor and pump assembly for driving the aerator in use. In one form, the engine or motor for driving the pump is an electric motor, hydraulic motor, pneumatic motor or similar. Typically, the size of the motor is from about 2.2 kw to about 15 kw and typically, the capacity of the pump is from about 0.5 megaliters per day to about 8 megaliters per day or more, depending upon requirements.

In one form, the aerator mixes gases, liquid and/or solids of the second material into liquids through mass acceleration of the gases, liquids or solids, into the liquid of the first material to form a more or less homogenous or disperse mixture of the various components, preferably a mixture of air and water.

In one form, the mixing element is an air injector, an air introduction port, an aerating point, a venturi, or the like for introducing air into a liquid. Typically, the mixing element is an air introduction point, such as for example, a venturi. Typically, the aerator has a multitude of venturis. In one form, each pathway within the aerator has its own dedicated venturi to aerate the water in the individual flow path. In one form, the venturi is provided with one or more apertures, typically a single central aperture.

One form of a pump suitable to use with the aerator is a Flygt 5.9 kw pump, being Model No. NP3127MT, with a 437 impeller suitable for pumping water.

In one form, the aerator has 8 air injectors, each of a nominal outlet nozzle diameter of 61.5 (ID) actual 60.3 mm and an inlet venturi diameter (ID) of 30 mm.

One form of the aerator provided with 8 injectors is capable of pumping about 4.396 Ml/d of water through the 8 branches each having substantially the same flow rate in each branch.

Each injector is capable of introducing air at a flow rate of 22.2 Ml/s into the corresponding water stream through each venturi which equates to about 43.387 Ml/d so that the ratio of water to air is up to about 1:15, more typically, up to about 1:10. However, the range of ratios of water to air can vary from about 1:1 to about 1:20 or more.

In one form, the amount of oxygen being delivered to the body of water is about 0.089 Ml/d through the aerator having 8 substantially identical air injectors. The mass flow of oxygen is about 541.21 kg/hr provided by the eight injector aerators.

In one form, the pontoon, if provided to support the aerator, has polypropylene floats internally filled with waterproof expansion foam.

The mixing apparatus, assembly or device can be used in a wide variety of different applications in a number of different industries. One such application is in respect of water remediation in a variety of industries, including the food processing industry, mining industry, manufacturing industries, water treatment applications, sewage treatment plants, water supply reservoirs, sludge collection or settling ponds, catchment areas, bodies of water subject to microbiological growth, such as algal blooms or algal contamination, emission of malodours, or the like.

Using the apparatus, results in improvement in water quality and waste quality control for waste waters being discharged to the usual water disposal system or drain. However, other applications are possible since the use of the assembly has a far wider appeal in general industry for its role in reducing biological and chemical oxygen demand (BOD and COD, respectively) in effluent streams. In the general food industry, the assembly has wide application, such as for example, when paired with the introduction of other treatments into waste waters for discharge, thereby expanding the appeal and efficiency of the assembly across industry as a replacement for numerous commonly used chemicals which are both expensive and potentially harmful, if the chemicals are toxic, thus reducing the carbon footprint of the chemicals being replaced.

Forms of the assemblies can be used in the following situations for mixing a wide variety of materials.

Mixing of gases into liquids.

Mixing of liquids into liquids.

Mixing of micro particles (solids) into liquids through to semi viscous fluid/liquids.

Aeration of water bodies, increase in oxygen levels of ponds and lakes.

Waste control tanks, including pre sewer delivery treatment aeration of water for aerobic digestion.

Non toxic destruction of algae blooms—example blue green algae reduction by breaking of the organism's chain, thereby eliminating the algae's ability to reproduce. As a cyanobacterium (cyanophyta) including blue green bacteria expels cyanide when put into toxic shock from chemical methods of poisoning the amount of toxicity is reduced.

Foam reduction of gaseous fluids.

A particularly preferred embodiment of the mixing apparatus relates to oxygen injection into waste waters to enhance bioremediation.

Removal of chlorine and other chemicals form mains supplies since the need to use chlorine or other chemicals is reduced.

Sewer outlets, dump bin (waste) area, odorous storage areas.

Liquid waste reduction processes, dissolved air flotation (DAF) units.

Lifting of sediment into the primary water body, (sludge removal).

Industrial polluted water remediation.

Chemical waste streams.

Refrigeration odour control.

BRIEF DESCRIPTION OF THE DRAWINGS

One embodiment of the mixing apparatus will now be described with reference to the following drawings in which.

DETAILED DESCRIPTION

It is to be noted that the mixing apparatus can have a variety of different forms and different configurations with the discharge members arranged in a number of different orientations.

One form of the mixing apparatus will now be described with particular reference to the drawings to illustrate one example of the mixing apparatus.

Figure 5:
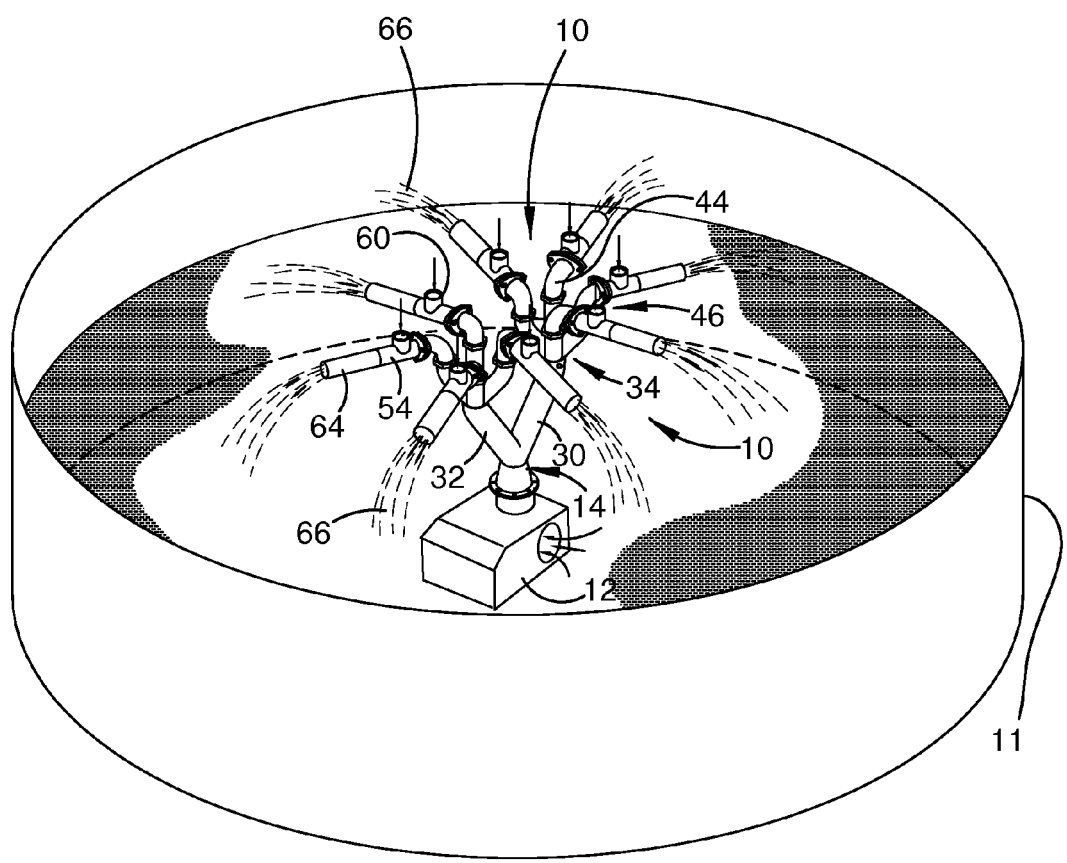
FIG. 5 is a schematic top perspective view of the form of the mixing apparatus of FIG. 1 in an in-use condition located in a body of water.
Figure 6A:
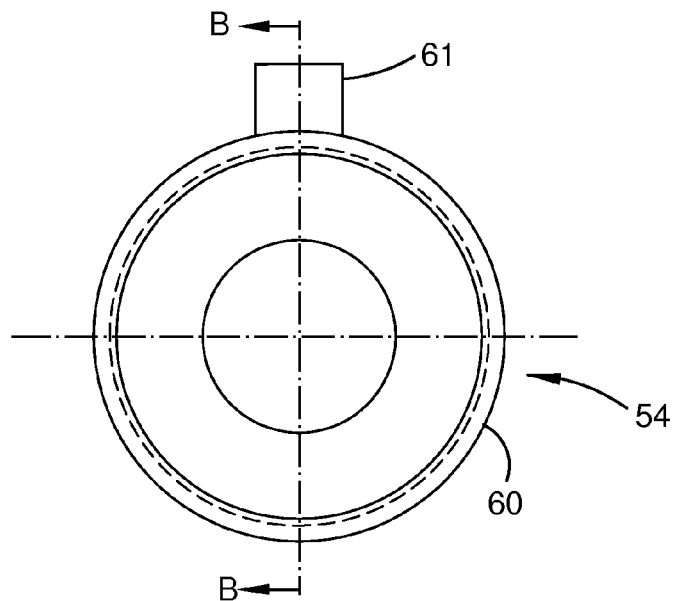
FIG. 6A is an end plan view of one form of a venturi of the mixing apparatus of FIG. 1.
Figure 6B:
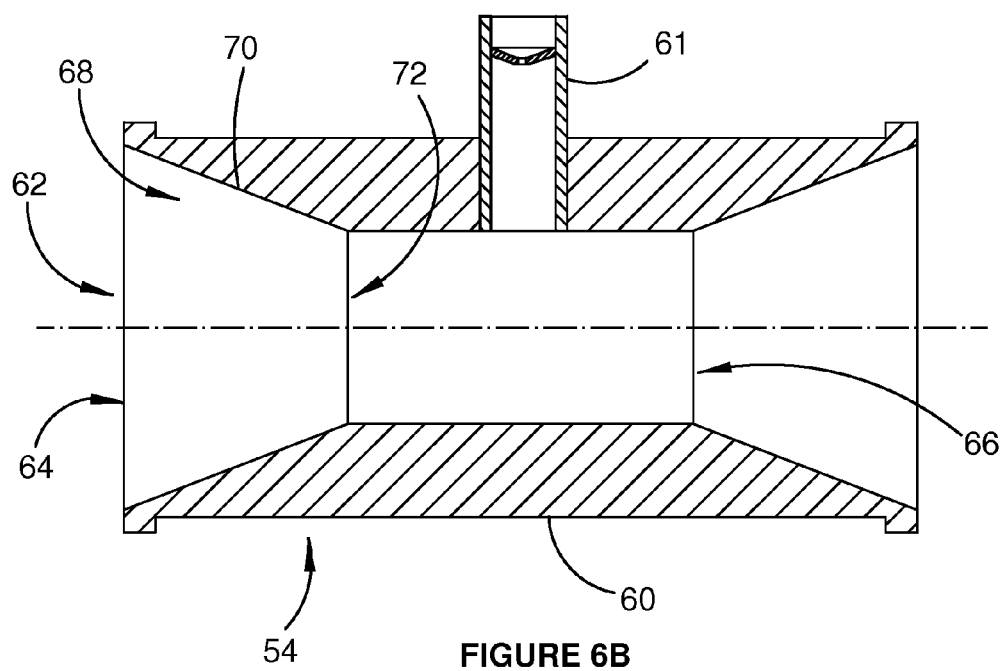
FIG. 6B is a cross-section view of the venturi of FIG. 6A.

In one form, mixing apparatus, generally denoted as 10, is typically in the form of an aerator for aerating water so as to improve the health of the water, particularly the biological health of the water, and to encourage increased biological activity within the water, typically in a body of more or less stagnant water, such as a pond, lake, reservoir, tank, or the like, generally denoted as 11 in FIG. 5. The usual purpose of aerating the body of water is to remediate the water so as to improve the oxygen content of the water for a variety of different purposes.

Figure 3:
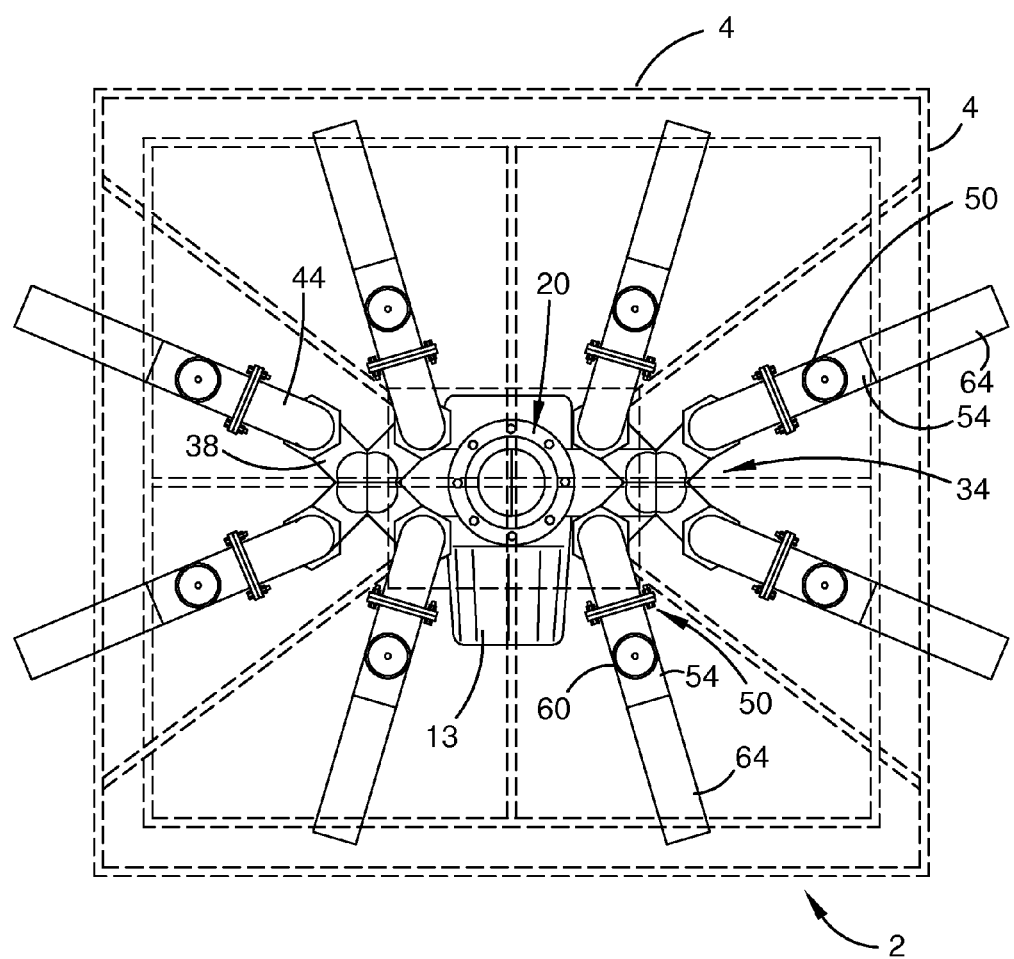
FIG. 3 is a top plan view of the form of the mixing apparatus of FIG. 1 in an in-use condition located on a suitable support structure, showing the orientation of individual discharge members.

Aerator 10 in use is located on the surface of the body of water 11 and is typically provided with a submerged pump 13, for pumping water to be treated through aerator 10. Aerator 10 is provided with a plenum chamber 12 or similar located at or towards the base of the aerator. In one form, pump 13, is optionally located within plenum chamber 12. Alternatively, the pump is mounted to a framework of a supporting structure, such as for example a framework structure 2, as shown more particularly in FIGS. 3 and 7, comprising a suitable framework construction of framework members 4 in interconnected relationship mounted on floats (not shown). Other structures are possible such as pontoons on which mixing apparatus 10 can float on the body of water. In a further embodiment, the pump is connected directly to the inlet of aerator 10, as shown more particularly in FIG. 7 so that a plenum chamber is not required in this form. Pump 13 is submerged and is surrounded by water, such as by being located beneath the surface of the water body such that inlet 5 of pump 13 is submerged at all times for introducing water into aerator 10. In whatever form, pump 13 is submerged in the body of the water so that inlet 5 of pump 13, the pump body, and outlet 6 of pump 13, are all below the water level of the body of water in use.

Figure 7:
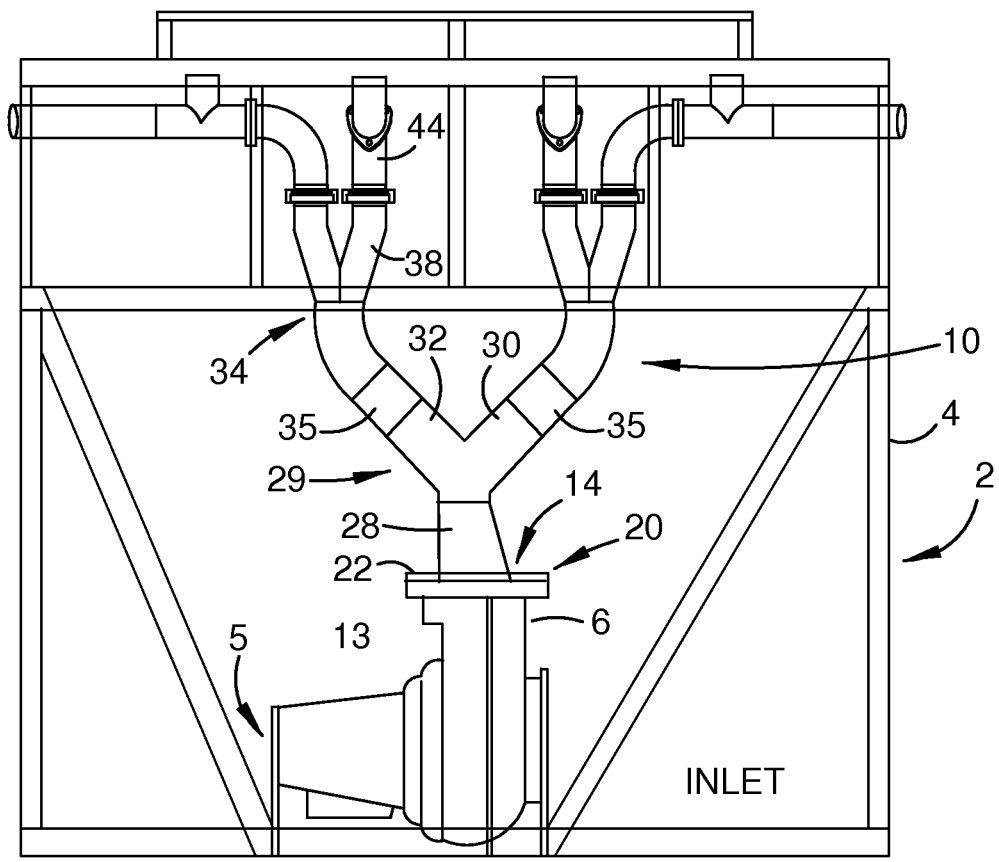
FIG. 7 is a schematic side elevation of one form of a structure for supporting the mixing apparatus of FIG. 1.

Outlet 6 of pump 13 is connected directly to inlet 14 of aerator 10 by a water tight connection, such as for example, a flanged coupling 20 or similar or to plenum chamber 12. One form of flange coupling 20 is shown in the drawings. Other forms of water tight couplings can be used. Flange coupling 20 includes a flange 22 having a plurality of apertures 24 located at regularly spaced apart locations around the circumference of the flange 22 for receiving therethrough suitable fasteners, such as bolts 26 to secure flange 22 to a complementary flange 23 on either of plenum chamber 12 having matching apertures 25 to apertures 24 of flange 22 or to a matching flange about outlet 6 of pump 13. Flange 22 is provided on one end of inlet tube 28 forming inlet 14 of aerator 10 through which the first material in the form of water is introduced into aerator 10 via pump 13 located below aerator 10. In one form, inlet 14 is in the form of an eccentric or tapered reducer having a relatively larger inlet port and a relatively smaller outlet port, such as for example, as shown in FIG. 7 which illustrates the eccentric arrangement of the tapered wall.

The other end of inlet tube 28 which is the upper end in use, is provided with a branch structure, such as for example, in one form being a Y-shaped tube, dividing this end of inlet tube 28 into two separate branches for dividing the supply of water into two different streams of water, preferably two equal streams of water. The end of inlet tube 28 is shaped such that the flow of water into each branch is substantially the same due to the flow within the two branches being balanced with respect to each other to assist the efficiency of operation of aerator 10.

In one form, inlet tube 28 of aerator 10 is provided with a transition portion 29 located at or towards the upper end thereof, which divides into a first conduit in the form of a first inclined tube 30 extending upwardly and outwardly to one side of aerator 10 and into a second conduit in the form of a second inclined tube 32 extending upwardly and outwardly to an opposite side of aerator 10 to tube 30. Thus, first inclined tube 30 and second inclined tube 32 have substantially the same rate of flow of water through them in use of aerator 10 because the join between the first and second inclined tubes 30, 32 at the transition portion 29, are closely matched to each other, such as being balanced to allow for equal flows of water through them, such as for example, by being gas-flowed or flow-rated to ensure that there are no surface irregularities on the inside of the walls of inlet 14, particularly internal walls of transition portion 29 to interfere with or interrupt flow within tubes 30, 32. It is to be noted the balance flow corresponds to substantially the same volumetric flow of water, the same mass flow of water, the same amount of water, the same velocity of water flow, preferably the same volumetric flow of water.

Figure 8:
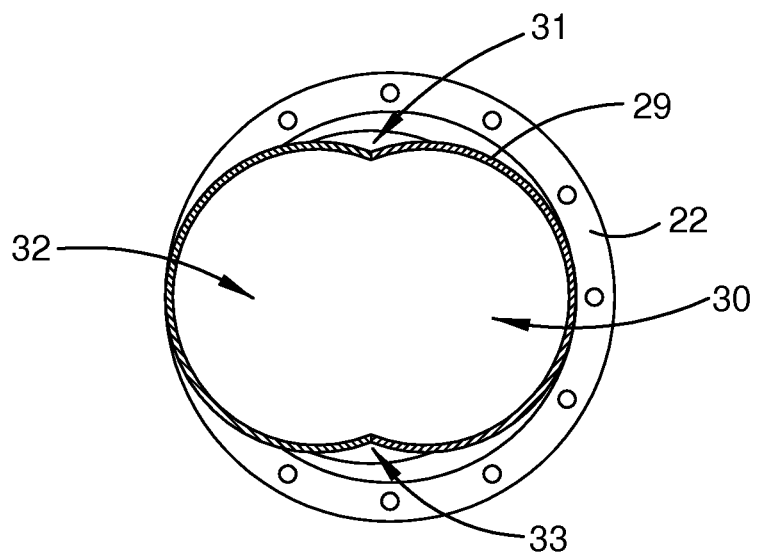
FIG. 8 is a cross-sectional view of one form of the inlet of the mixing apparatus of FIG. 1.

Transition portion 29 is shown in cross-section in FIG. 8 which shows how the single lower inlet merges into two upper outlets by the walls of transition portion 29 having a nipped waist at point 31, 33.

Turning now to first inclined tube 30, tube 30 extends from the outlet or discharge end of inlet tube 28 to a distributor member in the form of a manifold 34 having a single inlet portion 36 and four outlets all in fluid communication with each other. Optionally, a connector pipe, such as for example, a straight connector pipe 35, is located intermediate the outlet of inclined tube 30 and a curved part of manifold 34, such as illustrated in FIG. 7. Manifold 34 can have any suitable form or shape. Also, manifold 34 can be provided with any number of outlets arranged in any configuration or arrangement with respect to each other. One preferred configuration is illustrated in the drawings and has four diverging outlets which are curved to extend substantially in spaced apart parallel relationship to one another at their respective upper ends.

The preferred form of aerator 10 is provided with four individual discharge members arranged in the form of four outwardly diverging hollow legs forming discharge tubes 38a, 38b, 38c, 38d, emanating from a common connection point at which manifold 34 is connected to the outlet end of first inclined inlet tube 30. Discharge tubes 38a, 38b, 38c, 38d can have any suitable shape and be of any suitable form. In one form, each discharge tube 38a, 38b, 38c, 38d is provided with a transition portion 39a, 39b, 39c, 39d, which smoothly and gradually diverges into inclined lower part 40a, 40b, 40c, 40d which in turn, transition to substantially vertically extending upper part 42a, 42b, 42c, 42d in which each of the lower parts is divergent and the respective upper parts are bent or curved so as to extend substantially parallel to one another to extend substantially vertically.

Figure 4:
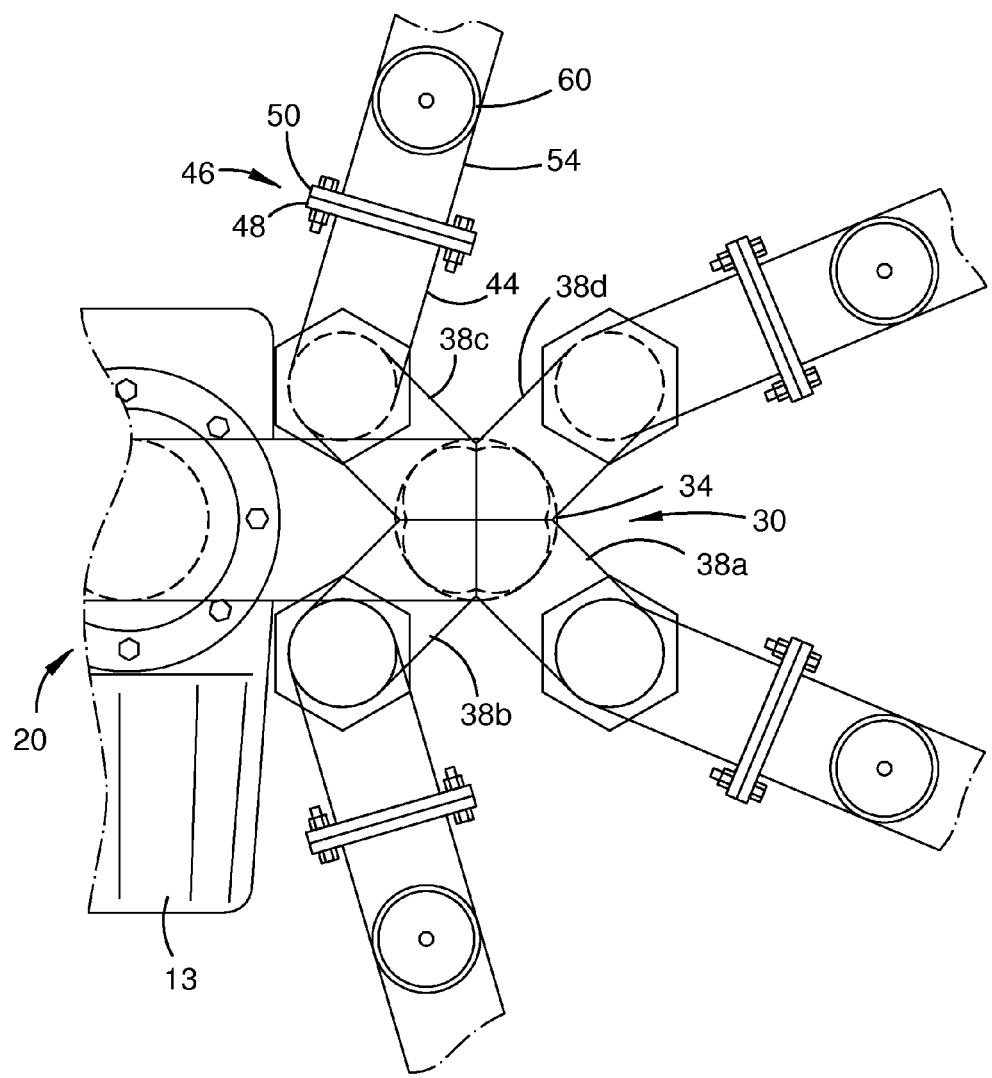
FIG. 4 is a top plan view of a section of the mixing apparatus of FIG. 1.

Further it is to be noted that the junction of the four individual discharge tubes 38a, 38b, 38c, 38d is arranged so that manifold 34 smoothly diverges from a single opening forming the inlet of manifold 34 to the four discharge legs 38 in conjoined relationship to one another to promote substantially equal flow rates in each of discharge tubes 38a, 38b, 38c, 38d because each tube 38a, 38b, 38c, 38d is balanced with respect to each other to ensure consistent flow, particularly the same volumetric flow of water. In one form, the shape of the conjoined outlets of the transition portion 39 is in the form of a quadricuspoid shape or similar such as a four leaf clover shape or similar shape in which there is a single wall with convexly curved side walls located between two adjacent tubes such that the wall smoothly forms gradually along the length of tubes 38. One form of the internal arrangement within the transition portion is shown in cross-section in FIG. 4 and in FIGS. 9A, 9B, 9C and 9D which are cross-sectional views taken through different locations of discharge tubes 38 of distributor 34 to illustrate the gradual transition from a single inlet tube to four separated individual outlet tubes.

Figure 9A:
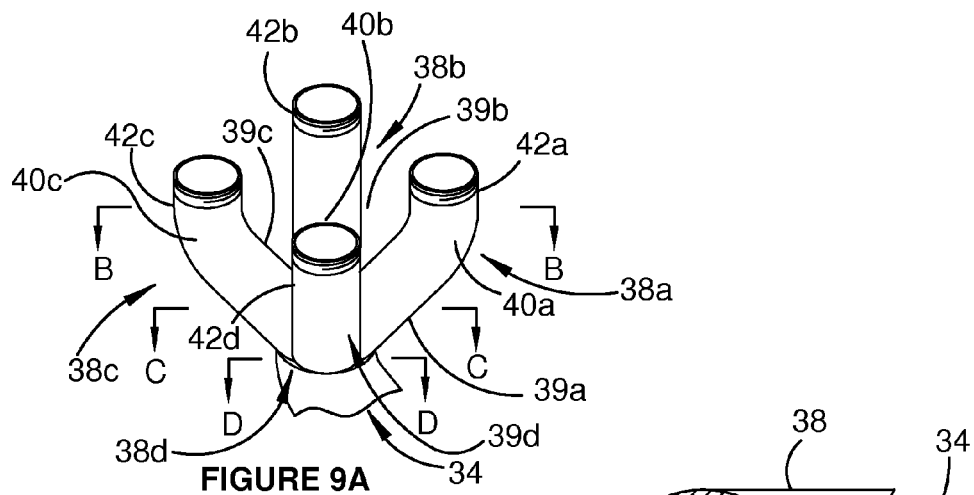
FIG. 9A is a perspective view of one form of a distributor member of the mixing apparatus of FIG. 1.
Figure 9B:
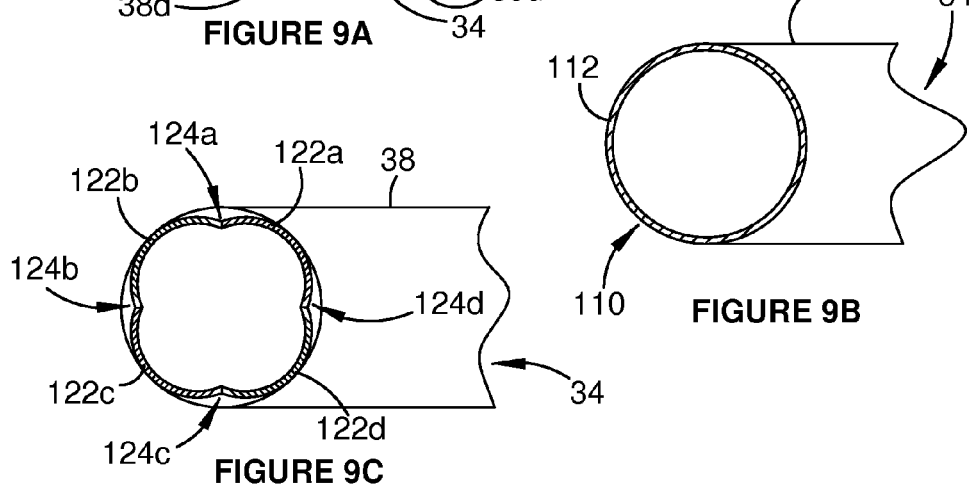
FIG. 9B is a cross-sectional view along line B-B of FIG. 9A.
Figure 9C:
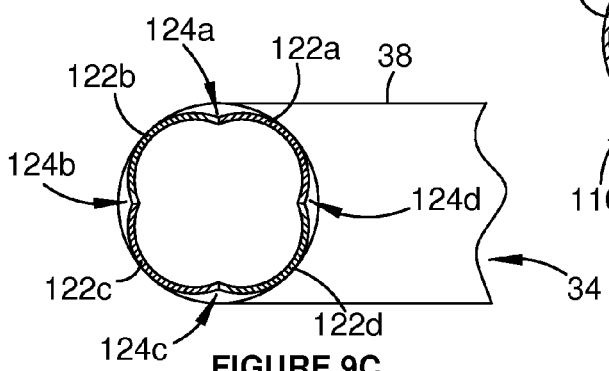
FIG. 9C is a cross-sectional view along line C-C of FIG. 9A.
Figure 9D:
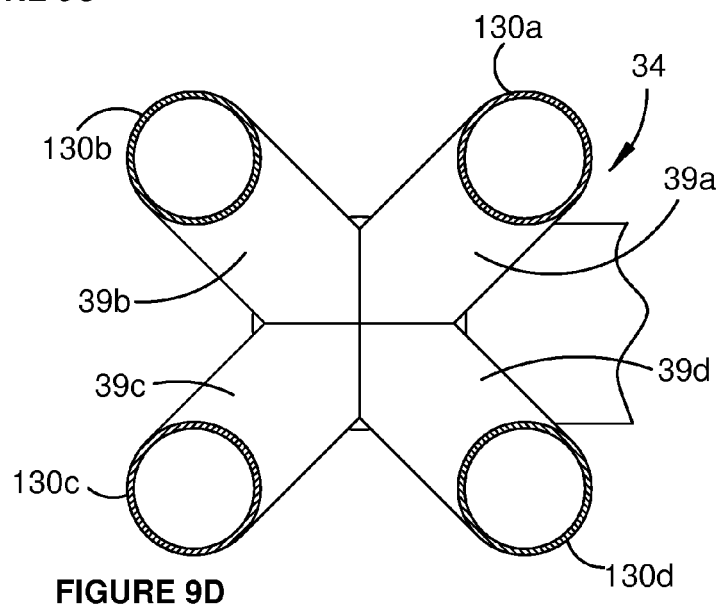
FIG. 9D is a cross-sectional view along line D-D of FIG. 9A.

In the transition portion, the single inlet 110 as shown in FIG. 9B is substantially circular having a single wall 112. Part way along transition portion 39, single wall 110 gradually changes into a wall 120 having a compound curve of four individual curved portions 122a, 123b, 122c, 122d, arranged in a quadricuspoid shape having a nipped waist 124, 124b, 124c, 124d, between wall sections 122, respectively as shown in FIG. 9C. The four upper ends 42 of discharge tubes 38 diverge away from one another to adopt spaced apart outlets of discharge tube 38, each discharge tube having a single circular wall 130a, 130b, 130c, 130d, as shown in FIG. 9D.

An elbow shaped joiner 44, or elbow assembly or 90° bend, is provided at or towards the distal end of each discharge tube 38a, 38b, 38c, 38d, and is connected to the upper part 142a, 142b, 142c, 142d of each tube 38a, 38b, 38c, 38d by a suitable water tight coupling 46 or similar, such as for example, a matingly threaded section or similar which optionally allows adjustment of the orientation of elbow joiner 44 with respect to discharge tube 38 to direct water being discharged from aerator 10 in a pre selected or required direction. The other end of elbow joiner 44 is also provided with a water tight coupling generally denoted as

48. In one form, flanged coupling 48 is in the form of a generally arcuate sided triangular shaped flange 49 for sealingly mating with a corresponding generally arcuate sided triangular shaped flange 50 of extension tube 54 to form a water tight seal for transporting water to extension tube 54.

It is to be noted that in other forms of the aerator, elbow joiner 44 can be joined to extension tube 54 by welding or similar fixing arrangement so that flanged coupling 48 can be omitted. Welding or similar fixing provides a water tight seal to allow the aerator to be operated efficiently.

Figure 1:
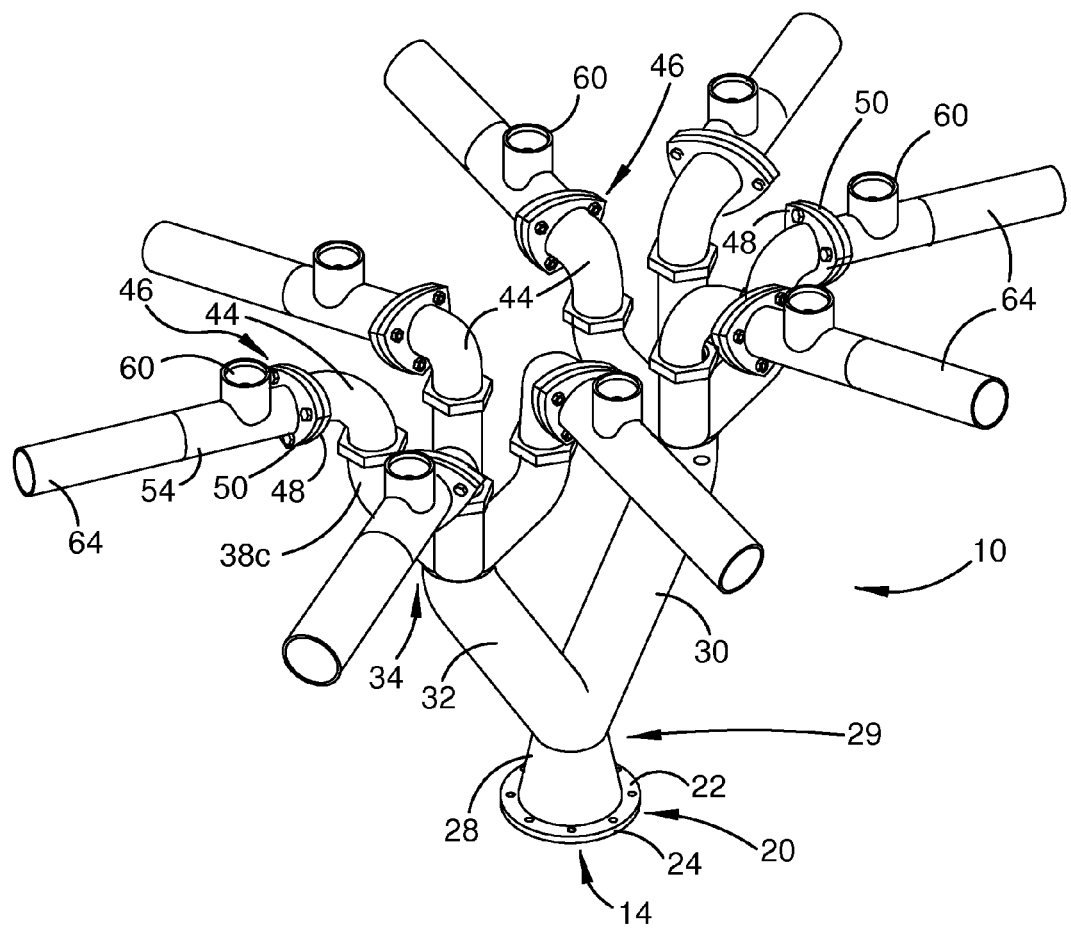
FIG. 1 is a top perspective view of one form of the mixing apparatus shown in isolation in an assembled condition.
Figure 2:
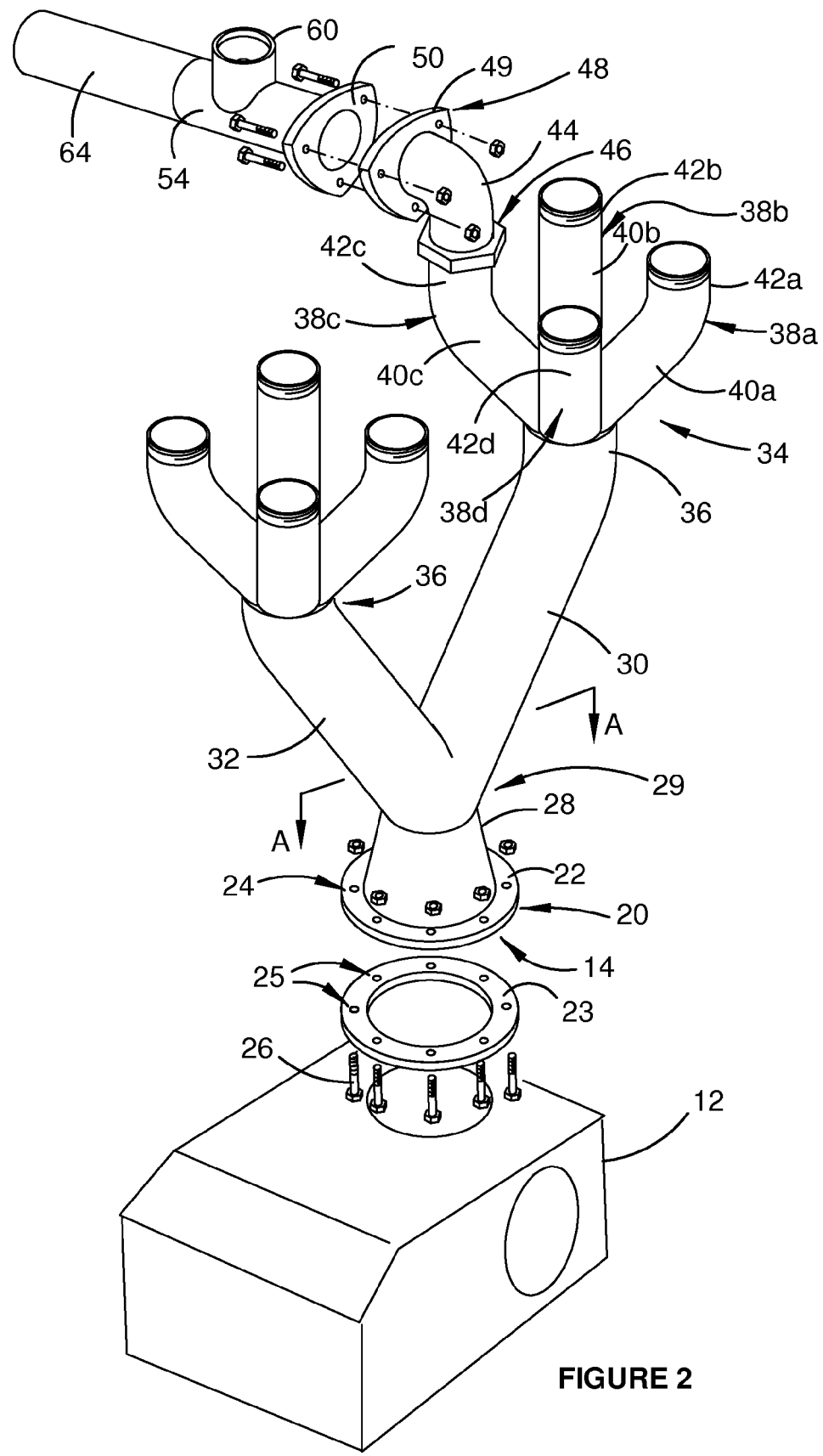
FIG. 2 is an exploded perspective view of part of the mixing apparatus of FIG. 1 and one form of a plenum chamber shown in isolation.

Extension tube 54 is provided with flange 50, complementary to flange 41 of elbow 44, and is connected to the outlet end of discharge tube 38 so that the position of each of extension tubes 54a, 54b, 54c, 54d can be adjusted to extend divergingly outwards from aerator 10 in different directions for forming an arc of discharge or similar to one side of aerator 10 as shown more particularly in FIGS. 1 and 5 in accordance with the requirements for aerating the body of water in which aerator 10 is located. It is to be noted that elbow joiner 44 and the corresponding extension tube 54 are movable with respect to the corresponding discharge tube 38 as a single unit about the threaded end of discharge tube 38.

In one form, extension tube 54 is straight however, tube 54 can have any suitable or convenient shape, including being curved or a simple shape, a complex shape, a compound shape, or a combination of two or more shapes or the like.

A mixing element, typically in the form of an air injector, air valve or similar is provided in each extension tube 54. In one form, the air injector is an air venturi 60 having an inlet end 64 for admitting a stream of water, an air injection port 61 for introducing a stream of air, and an outlet end 66 for discharging a stream of aerated water in which air is entrained within the water, or similar for introducing air into each extension tube 54 to aerate the stream of water flowing through the extension tube. Venturi 60 can have any suitable form or be of any suitable type which is capable of introducing the required amount or volume of air necessary to mix with the amount of water being pumped through the aerator in order to introduce sufficient oxygen into the body of water to treat the water of the body of water in which aerator 10 is located so as to improve the health of the water.

It is to be noted that as the amount of air withdrawn into venturi 60 is dependent on the actual flow of water through venturi 60. As the flow of water in each venturi 60 is substantially the same, the amount air introduced into each water stream in venturi 60 is substantially the same so that the amount or degree of aeration is consistent through all four flows through the individual venturis. Hence by balancing the flow of water in all four streams, the amount of aerated water being discharged through all four extension tubes is the same as is the oxygen content of all four streams.

An end tube 64 is provided at the distal end of each extension tube 54 to direct the flow of aerated water being discharged from aerator 10 to return to the body of water 11. It is to be noted that the four end tubes 64 are in the form of nozzles or similar and discharge aerated water in the forms of jets of water 66, in an arc of up to about 180°, or slightly less so as to cover one side of aerator 10, typically one entire side, as shown in FIG. 5.

One form of the venturi will now be described in detail. In one form, venturi 60 is provided with a passage 62 extending from inlet end 64 of venturi 60 to outlet end 66 of venturi 60. Inlet end 64 is provided as a relatively large inlet opening 68, usually of a circular shape, a first wall section 70 having straight walls tapering from the relatively large diameter inlet opening 68, to a relatively smaller diameter opening 72 located intermediate the ends 64, 66 of venturi 60. Passage 62 is provided with a second section having a constant diameter from opening 72 through to outlet 66 so as to form a constriction for accelerating the flow of water flowing through venturi 60 and accordingly reduce the pressure inside passage 62. The reduction in pressure allows air to be introduced through air inlet 61 of venturi 60.

A similar arrangement to that just described above is provided on the other side of aerator 10 extending from inclined tube 32 to end tube 64 to discharge aerated water in an arc at the other side of aerator 10 so that there is full coverage around aerator 10.

On this side, second inclined tube 32 corresponds to first inclined tube 30 so that the aerator is more or less symmetrical about the central axis. The arrangement of tubing connected to second inclined tube 32 is the same as the arrangement of tubing connected to first inclined tube 30 which has been described above and provides discharge of aerated water in jets 66 from end tubes 64 on the other side of aerator 10 in an arc of up to about 180° so that the aerator distributes aerated water over a full 360° around the aerator.

In one form, optionally, aerator 10 is provided with a cover, housing, surround, or the like fitted over the top of aerator 10 to further reduce the impact on the environment, such as to reduce noise or the like and/or to protect the aerator from adverse atmospheric conditions. In one form, the housing is provided with slots corresponding to the location of jets 66 being sprayed from end tubes 54 of aerator 10 to reduce the transmission of noise from the aerator in use.

In operation, aerator 10 is located in body of water 10 and pump 13 operated to withdraw water into inlet 14 of aerator 10 and through the tubing of aerator 10. After entering inlet 14, the water is firstly divided into two approximately equal volumetric streams in inclined tubes 30, 32 where they are conveyed to the respective distributors 34 wherein each of the two streams is split into four generally equal volumetric streams making eight individual streams of substantially equal flow rates i.e. volume of water, through the eight respective discharge tubes 38.

Water flowing through each tube 38 is directed into the respective extension tubes 54 by respective elbows 44. Aeration of each of the eight water streams takes place in each of the extension tubes 54 by admitting air collectively through inlet 61 of each of venturis 60 so that eight substantially equal streams of aerated water having substantially equal air content are discharged from the eight end tubes 64 in eight different streams in the forms of jets of water 66 arranged in an arc of 360° around aerator 10. As the aerator, particularly the transition parts 29 of inlet 14 and transition parts 39 of distributors 34, are flow-rated and balanced, the flow rates of each of the streams is about the same, typically volumetrically about the same, thereby improving the efficiency of the aerator, thus allowing the aerator to be of a smaller size and having a smaller capacity pump/motor combination which reduces the capital cost and maintenance costs.

Aspects of the present invention will now be described with reference to the following examples.

Example 1

One form of an aerator generally as described in this specification, being a 3.1 kw aerator, was installed in a wastewater holding pond at the rear of a processing factory for processing carrots at a Carrot Farm located in inland Victoria, Australia. The problem to be addressed was one of odour emanating from a wastewater pond at the rear of the factory which was the subject of complaints brought to the attention of the authorities.

The factory produces 1000 tonnes of carrots per week and employs over 30 people.

The installation of a 3.1 kw aerator generally in the form as described in this specification was effected in the pond. Within 1 month of installation, operation of the aerator resulted in the odour being completely removed and has not returned since the installation was effected.

Example 2

One form of an aerator generally as described in this specification, being a 3.1 kw aerator, was installed in a wastewater lagoon at an a abattoir, also located inland in the state of Victoria, Australia.

The problem to be addressed was of the standard of discharge and odour from the wastewater lagoon and the licence to discharge waste from the lagoon was under threat of being rescinded by the Environmental Protection Agency (EPA).

The abattoir processes 500 animals per day and employs over 100 people.

The installation of a 3.1 kw aerator and a drum filter in the lagoon was effected. Since the installation has been effected, operation of the aerator has resulted in no odours being detected and the EPA has reissued the abattoir's licence to discharge.

Example 3

One form of an aerator generally as described in this specification, being a 5.9 kw aerator, was installed in a wastewater dam at Western Water Purification Storage Dam located in the state of Victoria, Australia. This is the main winter storage facility for Western Water, a local supplier of water.

The problem to be addressed was a high blue green algal bloom preventing the reuse of the water for irrigation.

The installation of a 5.9 kw aerator in the dam was effected. Since the installation has been effected, operation of the aerator has resulted in the blue green algae count falling from 1.2 million cells per liter to 0-342 cells per liter and holding for three months during a period of the year when algal blooms proliferate.

Example 4

One form of an aerator generally as described in this specification, being a 3.1 kw aerator, was installed in a primary wastewater pond located at an Abattoir in the south east of the state of Victoria, Australia.

The abattoir processes 600 animals per day and employs 100 staff.

The problem to be addressed was odour in the primary wastewater pond.

The installation of a 3.1 kw aerator in the wastewater pond was effected. Since the installation has been effected, operation of the aerator has resulted in no odours being emanated from the pond.

Example 5

One form of an aerator generally as described in this specification, being a 3.1 kw aerator, was installed in a wastewater pond located at an Abattoir in New South Wales, Australia.

The abattoir processes several hundred animals per day.

The problem to be addressed was the emanation of odour and the non compliance on discharges under the EPA license.

The installation of a 3.1 kw aerator in the wastewater pond was effected. Since the installation has been effected, operation of the aerator has resulted in no odours emanating from the pond within three weeks of installation, the BOD's fell from 893 to 34 and suspended solids fell from 20,000 to 311 in the same period. The EPA licence of the Abattoir has been secured.

EXPLANATORY BACKGROUND OF THE EXAMPLES

The original purpose of the aerators, generally as described in the specification, was to accelerate the breaking down of bacterial pathogens in the traditional method utilising a low cost low maintenance aerator. The main improvement resulted in increased air and water intakes, and blending, which significantly added to this method of breakdown.

The use of a submersible pump into a collector manifold as opposed to a gear box method of operation, was the breakthrough innovation with the aerators. Further, the strategic use of venturis to assist in the blending of the air and water were tested and proved successful.

Original test results indicated the flow rates were approximately 4 megaliters of water to 2 megaliters of air passing through the aerator based on the 3.1 kw or 5.1 pump details. Following the success of the aerators, full scientific test results now indicate that the flow rates are approximately 10 times the earlier indicated rates.

The results provided in the above indicated examples involving odour control and improved discharges demonstrate the improvement of using the aerator of the present invention. The removal of the blue green algae at the storage dam was an additional benefit that was not expected or predicted. High performance levels as set out in the examples plus the low power cost and negligible maintenance to run the aerators provides an efficient and affordable, and beneficial system of treatment with further potential.

Table 1 of the present specification demonstrates the vast improvement in aeration resulting from the use of an aerator in accordance with aerators previously available. Particularly, the Oxygen Efficiency, (OE), of the aerator of the present invention 3.1 kw is 87.3 $kgO_2$/kwhr and 5.9 kw is 91.7 $kgO_2$/kwhr as compared to very much lower values of less than about 10 $kgO_2$/kwhr apart from the Flyght Jet Aerators which require significantly more power to operate, such as from 9 kkw to 55 kw.

Advantages

One or more embodiments of the mixing apparatus described herein have on or more of the following advantages.

In one form, the aerator is compact and efficient having physical dimensions of about 1.5 m×1.8 m with essentially no moving parts apart from the pump which is used to produce a flow of water through the mixing apparatus.

Embodiments of the mixing apparatus provide about four times the air movement or volume of air of currently available aerators.

Some embodiments of the aerator can process up to about 4 megaliters of water per day introducing about 2 megaliters of air to the water being treated and the aerator can operate for 24 hours a day on a continuous bases for lengthy periods without the need for adjustment, repair, replacement of parts or similar apart from relatively minor routine servicing not requiring the services of an heavy duty industrial crane to remove and replace the aerator from the water, but rather requires a relatively light duty lifting device or similar.

In some embodiments, the only moving part is the pump so that routine servicing and maintenance usually only requires checking the pump and the outlets of the aerator on a once yearly basis.

Some embodiments are light in weight, such as for example, weighing only about 320 kgs so that moving the aerator in and out of and around the body of water is readily performed without the need to use specialised lifting machinery or the like.

Some embodiments of the aerator use a 5.9 kilowatt rated pump which operates at 1440 rpm which is a lower rated pump than in currently available aerators which reduces the cost of the aerator and remediating the body of water using aeration. However, lower powered pumps can be used such as for example, as low as a 2.2 kw model of pumps.

Some embodiments are quiet in operation by being acoustically designed to allow low level noise to be produced, such as for example, about 40 decibels which is well below the required standard for noise emission of 60 decibels. The low level of noise emanating from the aerator allows for continuous operation for 24 hours a day if required without causing undue interference in the immediate vicinity of the aerator, such as for example, beyond about 100 m from the aerator.

The described arrangement has been advanced by explanation and many modifications may be made without departing from the spirit and scope of the invention which includes every novel feature and novel combination of features herein disclosed.

Those skilled in the art will appreciate that the invention described herein is susceptible to variations and modifications other than those specifically described. It is understood that the invention includes all such variations and modifications which fall within the spirit and scope.

TABLE 1

RESEARCH & DEVELOPMENT WORKING PAPER
WaterwisevAerator Measured Performance
SUMMARY
OXYGEN TRANSFER EFFICIENCY FOR VARIOUS TYPES OF AERATORS

| Equipment | OE (kg O2/kW.h) | Average kg $O_2$/kW.h |
|---|---|---|
| Waterwise 3.1 - SAE | 87.29 kgO2/kWhr | 87.3 KgO2/kWh |
| Warewise 5.9 - SAE | 91.73 kgO2/kWhr | 91.7 KgO2/kWh |
| Environmental Dynamics Inc. Tech Bulletin 127. | | |
| Energy consumption and typical performance of various types of aeration equipment. http://www.energy.siemens.com/hq/pool/hq/compression/special-applications/aeration/Applicationbrochure_January2010.pdf | | |
| Single stage turbocompressors | | |
| Fine bubble diffusers | 2.8-4.0 | 3.4 KgO2/kWh |
| Coarse bubble diffusers | 1.9-3.2 | 2.6 KgO2/kWh |
| PD blowers | | |
| Fine bubble diffusers | 2.5-3.1 | 2.8 KgO2/kWh |
| Coarse bubble diffusers | 1.5-2.1 | 1.8 KgO2/kWh |
| Pure Oxygen | 1 | 1.0 KgO2/kWh |
| Surface aeration | | |
| Disk aeration | 1.5-2.1 | 1.8 KgO2/kWh |
| Brush aerators | 0.9-2.0 | 1.5 KgO2/kWh |
| Multi stage oxygen transfer efficiency is generally in between the low & high-end examples above. | 0.9-4.0 | 2.5 KgO2/kWh |
| SSi Stamford Scientific International Inc. | | |
| High Efficiency Disc Diffusers | >5 | 5.0 KgO2/kWh |
| Landy-7 Surface aerator | 1.69 | 1.7 KgO2/kWh |
| Henan Zhongxin Environmental & Logistics Equipment Co., Ltd. High Efficiency Surface Aerator | 2.25-2.62 | 2.4 KgO2/kWh |
| EPCO/EEE Surface Aerator Model 5.5 kW 1460 rpm | 1.50 | 1.5 KgO2/kWh |
| Small bubble dispergerger* | 1.3-1.8 | 1.6 KgO2/kWh |
| Fine bubble diffuser aerator | 4.0-5.0 | 4.5 KgO2/kWh |
| Fine bubble diffusers - SAE[1] | 1.5-2.5 | 2.0 KgO2/kWh |
| Large bubble disperger* | 0.98 | 1.0 KgO2/kWh |
| Coarse bubble diffuser - SAE[1] | 2.0-2.5 | 2.3 KgO2/kWh |
| Coarse bubble diffuser - SAE[1] | 0.75-1.25 | 1.0 KgO2/kWh |
| Turbine agitator* | 1.2-1.38 | 1.3 KgO2/kWh |
| Surface aeration by mechanical agitator* | 1.68 | 1.7 KgO2/kWh |
| Deep shaft aerator* | 3.0-6.0 | 4.5 KgO2/kWh |
| Gas jet aerator* | 1.64 | 1.6 KgO2/kWh |
| Eddy jet mixer* | 4.78 | 4.8 KgO2/kWh |
| Flyght Jet aerators 1 Jet JA112 50/60 Hz N 3102 MT 3.1 kW SOTR peak | 4 | 4.0 KgO2/kWh |
| Flyght Jet aerators 1 Jet JA112 50/60 Hz N 3127 MT 5.9 kW SOTR peak | 7 | 7.0 KgO2/kWh |
| Flyght Jet aerators 1 Jet JA112 50/60 Hz N 3153 MT 9.0 kW SOTR peak | 10 | 10.0 KgO2/kWh |
| Flyght Jet aerators 2 Jets JA217 50/60 Hz NS 3171 MT 15 kW SOTR peak | 15 | 15.0 KgO2/kWh |
| Flyght Jet aerators 2 Jets JA217 50/60 Hz NS 3202 MT 22 kW SOTR peak | 20 | 20.0 KgO2/kWh |
| Flyght Jet aerators 3 Jets JA317 50/60 Hz NS 3202 MT 37 kW SOTR peak | 40 | 40.0 KgO2/kWh |

TABLE 1-continued

RESEARCH & DEVELOPMENT WORKING PAPER
WaterwisevAerator Measured Performance
SUMMARY
OXYGEN TRANSFER EFFICIENCY FOR VARIOUS TYPES OF AERATORS

| Equipment | OE (kg O2/kW.h) | Average kg $O_2$/kW.h |
|---|---|---|
| Flyght Jet aerators 4 Jets JA417 50/60 Hz NS 3301 MT 55 kW SOTR peak | 60 | 60.0 KgO2/kWh |
| Plunging jet* | 0.92-3.9 | 2.4 KgO2/kWh |
| Plunging venturi device[#] | 2.2-8.8 | 5.5 KgO2/kWh |
| Hollow inclined plunging jet^ | 2.56-10.73 | 6.6 KgO2/kWh |
| Blendair[2] (Mixaerator 7.5 kW at 1440 rpm) | 5.5 | 5.5 KgO2/kWh |

*Cited from Tojo and Miyanami "Oxygen transfer in Jet Mixers"
[1]http://www.waterandwastewater.com/cgi-bin/yabb/YaBB.pl?num=1247898379
[#]Emiroglu and Baylar
[^]S Deswal and DVS Verma
[2]http://www.muddyriv.com/blendair.html

The invention claimed is:

1. A mixing apparatus for creating a mixture of dissimilar first and second materials, the mixing apparatus comprising
an inlet adapted to accept the first material;
a first conduit in fluid communication with the inlet and adapted to form a first flow path of the first material;
a first distribution member in fluid communication with the first conduit, the first distribution member includes outlets that change the first flow path into respective individual flow paths of the first material, wherein flow of the first material in the respective individual flow paths is substantially the same; and
first discharge members in respective fluid communication with the outlets and extending substantially radially outward from the mixing apparatus in different orientations relative to each other to discharge the mixture from the mixing apparatus in different directions around the mixing apparatus, the first discharge members each includes a mixing element for introducing the second material into the respective first individual flow paths, thereby mixing the first and second materials to form the mixture.

2. The mixing apparatus according to claim 1, wherein the first material is water, the second material is air, and the mixing apparatus is an aerator adapted to mix the air and the water together to aerate the water for discharge from the aerator.

3. The mixing apparatus according to claim 1, further comprising a pump or pump assembly having a pump inlet adapted to accept the first material and a pump outlet in fluid communication with the inlet of the mixing apparatus.

4. The mixing apparatus according to claim 3, further comprising a plenum chamber disposed between the pump or pump assembly and the inlet.

5. The mixing apparatus according to claim 1, wherein the first conduit is a branched tube having a single first conduit inlet, a first conduit transition portion, and two first conduit outlets, wherein the branched tube merges gradually and continuously in a smooth transition from the first conduit inlet through the first conduit transition portion to the two first conduit outlets, wherein the first conduit transition portion has two curved wall portions in opposed face-to-face relationship to from the first flow path into two second flow paths.

6. The mixing apparatus according to claim 5, wherein the first conduit transition portion is bicuspoid having two pinch points or pointed parts formed by confluence of two converging surfaces of the curved wall portions of the branched tube, wherein the first conduit transition portion provides balanced flow through the first conduit and the two second flow paths are substantially the same.

7. The mixing apparatus according to claim 1, wherein the first distribution member is a branched or divided tube having a single inlet, a transition portion, and at least two separate outlets, wherein the transition portion is disposed between the single inlet and the at least two outlets, wherein the single inlet merges gradually or continuously in a smooth transition from the single inlet to the at least two outlets through the transition portion, wherein the transition portion is gas flowed, thereby forming a smooth gradual transition that promotes balanced flow through the first distribution member.

8. The mixing apparatus according to claim 7, wherein the transition portion has at least two curved wall portions in opposed face-to-face relationship with each other on either side of the single inlet, the at least two curved wall portions transitioning into the transition portion that diverges in the direction of flow of the first material through the single inlet to the at least two outlets.

9. The mixing apparatus according to claim 8, wherein a shape of the first distribution member is generally quadricuspoid having four pinch points or four pointed parts internally directed to a central axis of the transition portion, such that the transition portion is substantially symmetrical about the central axis when viewed in cross-section.

10. The mixing apparatus according to claim 1, wherein the flow of the first material in the respective individual flow paths is substantially the same volumetrically.

11. The mixing apparatus according to claim 1, wherein the first distribution member is a manifold having a single inlet and four individual outlets forming a one into four distribution manifold.

12. The mixing apparatus according to claim 8, wherein the transition portion includes gradual smooth continuous transition walls, wherein the walls are free from surface irregularities, projections, depressions or sharp angles.

13. The mixing apparatus according to claim 1, wherein each of the mixing elements is disposed in a respective component of the first discharge members.

14. The mixing apparatus according to claim 2, wherein each of the mixing elements is disposed in a respective first discharge member and each of the mixing elements is an air injector, an air introduction port, an aerating port, an aerating point or a venturi adapted to introduce the air into the water in the respective first discharge member.

15. The mixing apparatus according to claim 1, wherein the first distribution member is a pair of first distribution members, each of the pair of first distribution members having a single inlet and separate outlets, the pair of first distribution members being in fluid communication with the first conduit and the separate outlets changing the first flow path into the respective individual flow paths.

16. The mixing apparatus according to claim 15, wherein each of the pair of first distribution members has four outlets, wherein each outlet is in fluid communication with a respective first discharge member, wherein the first discharge members include two pairs of four first discharge members forming eight separate first discharge members, wherein the eight separate first discharge members are disposed at spaced apart locations from each other.

17. The mixing apparatus according to claim 1, wherein each of the first discharge members includes an extension tube and an elbow joiner, wherein the elbow joiner is disposed between the first distribution member and the extension tube, wherein the mixing element is located in the extension tube and the elbow joiner orients the extension tube to extend radially outward.

18. The mixing apparatus according to claim 3, wherein the mixing apparatus is located in a body of water, wherein the mixing apparatus further comprises a fixed base adapted to anchor the mixing apparatus within the body of water or a float arrangement adapted to allow the mixing apparatus to float on the surface of the body of water, wherein at least a part of the pump inlet is submerged within the body of water.

19. A mixing apparatus for creating an aerated mixture of water and air, the mixing apparatus comprising:
an inlet adapted to accept the water;
a first conduit in fluid communication with the inlet and adapted to form a first flow path of the water;
a second conduit in fluid communication with the inlet and adapted to form a second flow path of the water;
a first distribution member in fluid communication with the first conduit and changing the first flow path into respective first individual flow paths of the water;
first discharge members adapted to receive the respective first individual flow paths and oriented in different first directions relative to each other to discharge the mixture from the mixing apparatus in different first directions around the mixing apparatus;
a second distribution member in fluid communication with the second conduit and changing the second flow path into respective second individual flow paths of the water, and
second discharge members adapted to receive the respective second individual flow paths and oriented in different second directions relative to each other to discharge the mixture from the mixing apparatus in different second directions around the mixing apparatus,
wherein each respective discharge member of the first and second discharge members includes a mixing element adapted to introduce the air into the water in or through the first and second discharge members, and flow of the water in each one of the first and second discharge members is substantially the same as each other.

20. A mixing apparatus for creating a mixture of water and air, comprising:
an inlet adapted to accept the water;
a first conduit in fluid communication with the inlet;
a second conduit in fluid communication with the inlet and with the first conduit;
a first distribution member disposed between the first conduit and first individual discharge members, wherein each of the first individual discharge members is in fluid communication with the first conduit and extends substantially radially outward from the mixing apparatus in different first orientations relative to each other to discharge the mixture from the mixing apparatus in different first directions around the mixing apparatus; and
a second distribution member disposed between the second conduit and second individual discharge members, wherein each of the second individual discharge members is in fluid communication with the second conduit and extends substantially radially outward from the mixing apparatus in different second orientations relative to each other to discharge the mixture from the mixing apparatus in different second directions around the mixing apparatus,
wherein each of the first and second individual discharge members includes a mixing element for introducing the air into the water, and flow of the mixture in each one of the first and second individual discharge members is substantially the same as one another due to balanced flow through the mixing apparatus from the first conduit to the first and second individual discharge members.

* * * * *